March 7, 1939.  J. W. TATTER  2,150,111
METHOD OF MAKING WHEEL STRUCTURES
Original Filed Feb. 20, 1936  2 Sheets-Sheet 1
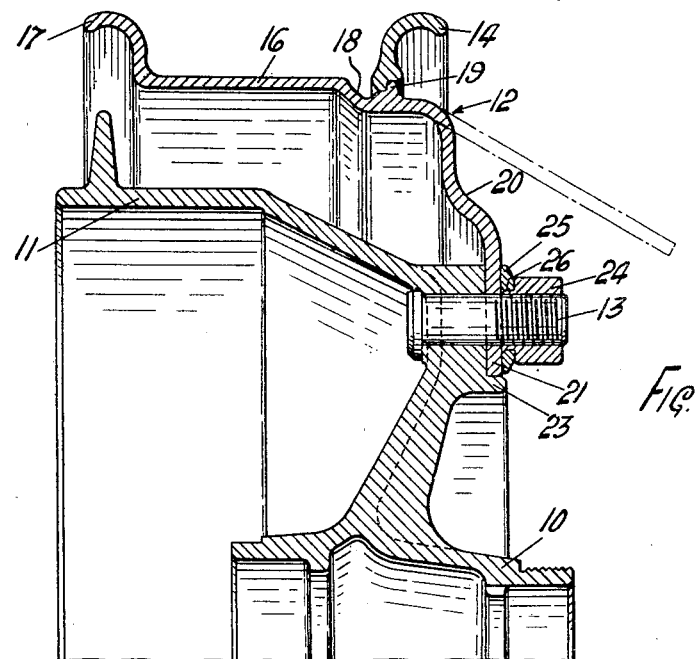
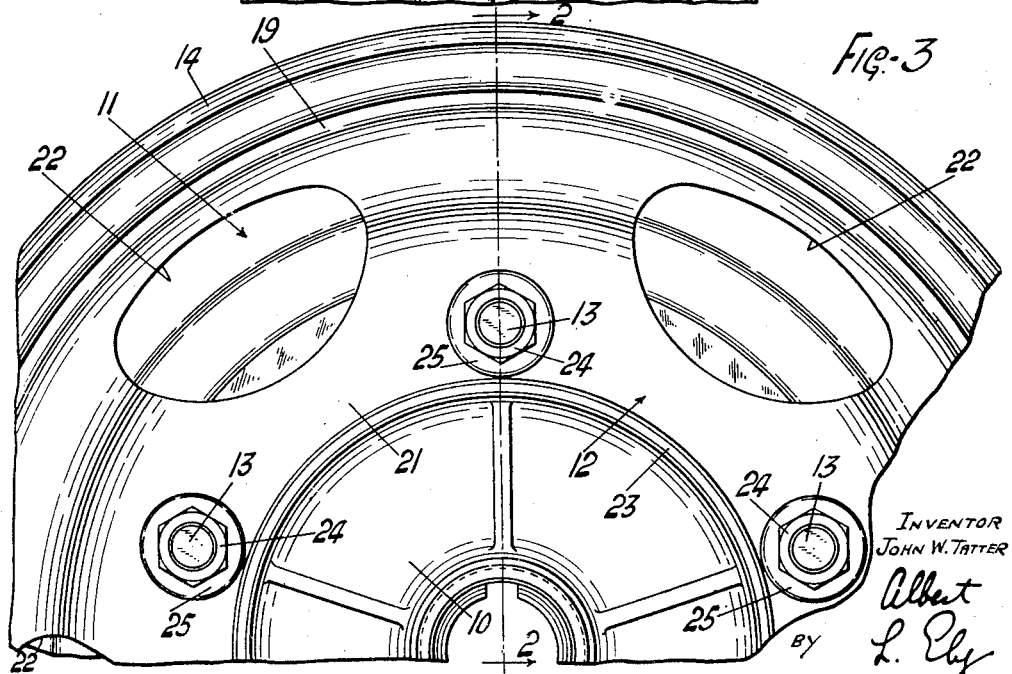
INVENTOR
JOHN W. TATTER
BY
Attorney March 7, 1939.    J. W. TATTER    2,150,111
METHOD OF MAKING WHEEL STRUCTURES
Original Filed Feb. 20, 1936    2 Sheets-Sheet 2

INVENTOR
JOHN W. TATTER
BY Albert L. Ely
Attorney

Patented Mar. 7, 1939

2,150,111

UNITED STATES PATENT OFFICE 2,150,111

METHOD OF MAKING WHEEL STRUCTURES

John W. Tatter, Akron, Ohio, assignor, by mesne assignments, to The Firestone Tire & Rubber Company, Akron, Ohio, a corporation of Ohio Original application February 20, 1936, Serial No. 64,843. Divided and this application June 5, 1936, Serial No. 83,651

4 Claims. (Cl. 29—159.1)

This invention relates to wheel structures and to methods of making the same, and more especially it relates to vehicle wheel structures such as are made of metal and comprise rims for pneumatic tires thereon, and to improved procedure for making such wheels.

The invention is of especial utility in the manufacture of metal wheels of the type known as "disc wheels" which, as heretofore constructed, have comprised individual discs and tire rims, the latter being either removably or permanently attached to the discs.

The chief objects of this invention are to provide improved procedure for the manufacture of rim and disc structures of the character mentioned, and to provide improved attaching means for securing said structures to a hub. Other objects will be manifest.

Of the accompanying drawings:

Figure 1 is a transverse section of an elongate metal strip or shape from which the improved wheel structures are made;

Figure 2 is a section of a finished wheel structure taken on the line 2—2 of Figure 3;

Figure 3 is a fragmentary front elevation of a finished wheel structure;

Figure 4:
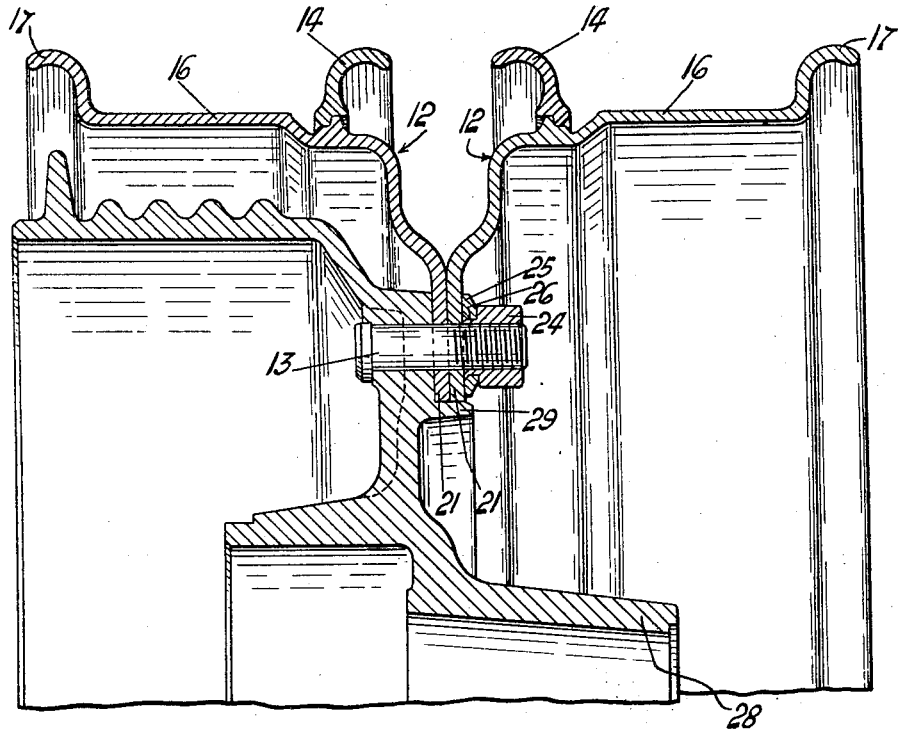
Figure 4 is a section similar to Figure 2 showing a dual arrangement of the improved wheel structure.

This application is a division of my co-pending application, Serial Number 64,843, filed February 20, 1936.

Referring to Figures 2 and 3 of the drawings, the improved wheel comprises a hub structure 10 that may include a brake drum 11 formed integral therewith, and a one-piece rim and disc structure 12 mounted thereon and secured thereto by a plurality of bolts 13, 13. The rim portion of the wheel structure carries a removable, endless or transversely split side ring 14 of the usual or desired type.

The rim and disc structure 12 is annular and comprises a substantially cylindrical tire-receiving portion 16 that is formed with a radially outwardly extending flange 17 on one margin thereof for engaging one bead portion of a tire (not shown) that may be mounted upon tire-rim portion. At the opposite side of the cylindrical rim portion of the structure there is formed a circumferential, depressed gutter 18 bordered on one side by a circumferential rib 19, the removable side ring 14 normally seating upon said rib and extending partly into said gutter. Laterally of the rib 19 the structure curves radially inwardly, and therebeyond is formed in a reverse curve at 20 that terminates in an inner peripheral portion 21 disposed parallel to the plane of the structure, but spaced somewhat laterally of the rim portion 16 thereof. The radially inwardly extending portion of the structure constitutes the disc portion thereof, and this portion is formed with a circumferential series of apertures 22, 22 that permit the passage of air through the wheel whereby cooling of the brake drum is effected.

When the structure 12 is mounted upon the hub 10, the inner peripheral portion 21 laterally abuts a laterally facing disc-seat formed on said hub, said disc-seat including a laterally projecting rib 23 that fits snugly within the inner perimeter of portion 21 of structure 12. The bolts 13 that secure structure 12 to hub 10 include nuts 24, each of which has a normally concavo-convex spring washer 25 swiveled onto an axially projecting flange 26 formed on the nut, said flange having its end portion peened over so as to retain the washer in permanent association with the nut. The construction is such that the wheel structure always is tightly secured to the hub, the spring of the washers taking up any looseness of the nuts.

Figure 5:
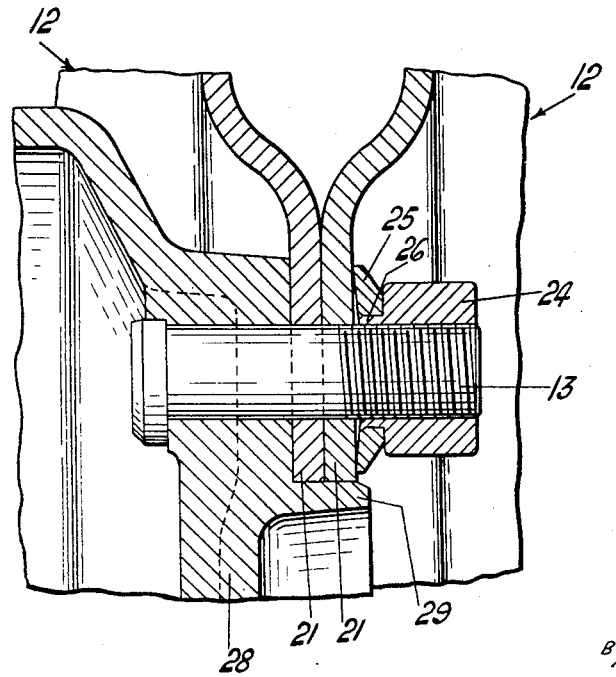
Figure 5 is a detail sectional view, on a larger scale, showing the improved nut and washer used for attaching the improved wheel structure to a hub, before said nut and washer are tightened to final position.

In the embodiment of the invention shown in Figures 4 and 5 two identical rim and disc structures 12 are mounted in dual arrangement upon a single hub 28. The latter is very similar to hub 10 of the previously described embodiment, but preferably is more rugged than the latter and has a laterally projecting flange 29 of sufficient width to engage the inner perimeter of both structures 12. The structures 12 are mounted upon the hub 28 in reverse position, that is, the inner peripheral portions 21 of the respective structures abut each other, and the removable rings 14 are adjacent each other. Because the portions 21 of the structures 12 are disposed laterally of the rim portions 16 thereof, the latter are thereby spaced apart sufficiently so that the tire on one rim will not be in contact with the tire on the other rim.

The method of manufacturing the improved wheel structures 12 will best be understood from reference to Figure 1 wherein is shown a section of an elongate strip or shape 30 that ultimately becomes a wheel structure 12. The strip 30 is formed by hot rolling in long lengths. When cold, the strips are cut into short sections each of proper length to form a single annular wheel structure, and thereafter each of said sections is bent into circular form and its ends welded together to form an annulus. The succeeding step is a cold rolling operation wherein the annulus is rolled to an intermediate shape. In this operation that portion of the annulus that includes the flange 17 of the finished structure is stretched radially outwardly sufficiently to form the cylindrical rim portion of the finished structure, the opposite side of the annulus being inwardly bent from the central region laterally of the rib 19, as indicated in broken lines in Figure 2. The final shaping of the structure is accomplished by a cold pressing operation that presses disc portion of the structure into the ultimate shape shown in full lines in the drawings. Subsequently the apertures 22 and holes for bolts 13 are punched in the disc and the inner perimeter thereof cut accurately to proper size.

The invention provides a wheel structure that is more economically manufactured than those of which rim and disc are individually constructed. The wheel structures may be used alternatively for single or dual use, and the permanently associated nuts and spring washers assure that the connection between hub and disc structure will not readily loosen, and that nuts and washers will not separate and more easily be lost.

Modification may be resorted to without departing from the spirit of the invention or the scope of the appended claims.

What is claimed is:

1. The method of making wheel structures consisting of unitary tire rim and disc portions which comprises hot rolling a straight length of metal strip into the transverse shape of a transversely curved tire rim with a lateral extension of substantially its own width on one of its margins, shaping the straight strip into an annulus with the transversely concave side of the strip innermost and thereafter joining the abutting ends thereof, cold rolling the annular structure and thereby moving the transversely curved portion of the tire-rim structure radially outwardly to cylindrical form and moving the lateral extension thereof obliquely inwardly to an intermediate position, and thereafter forcing the lateral extension, by cold pressing the same, to a position extending radially inward from the said rim portion.

2. The method of making wheel structures consisting of unitary tire-rim and flanged supporting portions which comprises, hot rolling a straight metal blank and thereby simultaneously forming a plane portion along one marginal edge, a relatively stiff tire-retaining-ring gutter at the inner extremity of said plane portion, and a downwardly inclined portion constituting the rim base that extends from the top of said gutter and terminates in an upstanding tire retaining flange, shaping the straight metal blank into an annulus with the downwardly inclined portion defining a frusto-conical structure having the tire-retaining flange at the small end thereof and thereafter joining the abutting ends thereof, and then cold rolling the annular structure and thereby expanding said tire flange and its base portion and moving said originally plane marginal portion to cylindrical shape radially inward while maintaining said stiff gutter in substantially its original shape and size.

3. The method of making wheel structures consisting of unitary tire-rim and flanged supporting portions which comprises hot rolling a straight metal blank and thereby simultaneously forming a plane portion along one margin thereof, a relatively stiff tire-retaining-ring gutter at the inner extremity of said plane portion, and a downwardly inclined portion constituting the rim base which extends from the top of said gutter and terminates in an upstanding tire retaining flange, shaping the straight blank into an annulus having a frusto-conical portion with the tire-retaining flange on the small end thereof and thereafter uniting the abutting ends thereof, cold rolling the annular structure and thereby expanding said rim base to cylindrical shape and moving said originally plane marginal portion obliquely inward while maintaining said stiff gutter substantially in its original annular size and shape, and thereafter cold pressing a portion of said obliquely extending structure into parallelism with the annulus of the rim portion.

4. The method of making wheel structures consisting of unitary tire-rim and flanged supporting portions which comprises hot rolling a straight metal blank and thereby simultaneously forming a relatively heavy, stiff gutter portion for mounting a demountable tire-retaining ring, a plane portion on one side of said butter portion, and a downwardly inclined portion on the other side of said butter portion and terminating in an upstanding marginal tire-retaining flange, thereafter circling the blank and uniting the abutting ends thereof to produce an annular structure having a frusto-conical portion with the tire-retaining flange on the small end thereof, cold rolling the structure and thereby expanding the portion having said tire retaining flange and thus forming a rim base of cylindrical shape, and contracting said originally plane portion and thereby providing an annular inwardly extending supporting flange, while maintaining said stiff gutter portion substantially in its original annular shape and size.

JOHN W. TATTER.